(12) United States Patent
Midden et al.

(10) Patent No.: US 10,959,562 B2
(45) Date of Patent: Mar. 30, 2021

(54) MILK FOAM DISPENSING SYSTEM

(71) Applicant: BUNN-O-MATIC CORPORATION, Springfield, IL (US)

(72) Inventors: William E. Midden, Springfield, IL (US); Suresh Radhakrishnan, Springfield, IL (US); Rex Allen Rogers, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 387 days.

(21) Appl. No.: 15/727,466

(22) Filed: Oct. 6, 2017

(65) Prior Publication Data

US 2018/0220837 A1    Aug. 9, 2018

Related U.S. Application Data

(60) Provisional application No. 62/405,189, filed on Oct. 6, 2016, provisional application No. 62/421,999, filed on Nov. 14, 2016.

(51) Int. Cl.
     *A47J 31/44*      (2006.01)
     *A47J 43/12*      (2006.01)

(52) U.S. Cl.
     CPC ......... *A47J 31/4485* (2013.01); *A47J 43/121* (2013.01)

(58) Field of Classification Search
     CPC ....... A47J 31/41; A47J 31/4485; A47J 43/121
     USPC ....... 99/323.3, 293, 275, 453, 455; 426/474, 426/477, 590, 591, 592, 593, 594, 595, 426/596, 597, 598
See application file for complete search history.

(56) References Cited

U.S. PATENT DOCUMENTS

2014/0322415 A1    10/2014   Buchholz et al.
2015/0020691 A1*   1/2015   Midden ............... A47J 31/4485
                                                                                   99/323.3

FOREIGN PATENT DOCUMENTS

CA          2102732        1/2007

* cited by examiner

*Primary Examiner* — Phuong T Nguyen
(74) *Attorney, Agent, or Firm* — Barnes & Thornburg LLP (57) ABSTRACT

A system, method, and apparatus for producing an ingredient foam such as milk foam for use with other products such as beverages. An ingredient dispensing assembly is included for receiving one or more ingredients from an ingredient dispensing apparatus, processing the ingredients and dispensing a general uniform, consistent foam. The ingredient dispensing assembly includes a whipping chamber, an output nozzle, and an insert retained within cavities defined by the whipping chamber and output nozzle. The internal surfaces of the chamber and nozzle cavities in combination with the insert provide passages defining a mixing zone, a shredding zone communicating with the mixing zone, and a deceleration zone communicating with the shredding zone. The assembly passes at least one ingredient through the zones to dispense foam from an exit port of the outlet nozzle. The system includes apparatus and methods for reducing the dissociation of foam dispensed form the exit port.

2 Claims, 11 Drawing Sheets

FIG. 11

MILK FOAM DISPENSING SYSTEM

CROSS REFERENCE TO RELATED APPLICATIONS

This application claims the benefit of priority under 35 U.S.C. § 119(e) to U.S. Provisional Patent Application No. 62/405,189, filed Oct. 6, 2016, and U.S. Provisional Patent Application No. 62/421,999, filed Nov. 14, 2016. The disclosures set forth in the referenced applications are incorporated herein by reference in their entireties.

BACKGROUND

The present disclosure relates to a milk foam producing system which can be used to produce heated, chilled, or ambient temperature foam or foam of controllable temperature as defined by the user. Much of the information relating to the overall general background of mixing foam using a shearing process is disclosed in U.S. Pat. No. 9,386,878 which is incorporated herein by reference in its entirety. This disclosure uses the teachings of this patent to enhance the development, maintenance, and dispensing of generally homogenous, high quality, consistent milk foam for use with a variety of food products. One example, by way of illustration and not limitation, of how the foam can be used is with coffee or similar beverages. In a variety of coffee beverages milk foam is used as an important ingredient for combination with coffee such as in a latte, cappuccino, or other similar milk-coffee beverages.

One of the potential issues associated with prior art milk foam producing equipment is that the bubble size was relatively uncontrollable, producing irregular and inconsistent foam products. Additionally, another issue with prior milk foam dispensing equipment is that the milk foam tended to splatter or disassociate as it exited the dispensing or exit port. Attempts have been made to provide a laminating blade in the throat and at the mouth of an exit port or nozzle.

It would be desirable to provide a milk foam dispensing system in which the components can be readily removed from the apparatus for periodic cleaning and sanitizing as might be required by a user's cleaning program.

One of the issues that can occur with regard to the milk dispensing assemblies is that the milk foam dispensed from the assembly can tend to splatter. This could be due in part to the relatively aggressive flow of steam into the milk prior to introduction of ingredients into the chamber defined by the introduction into the chamber of the milk dispensing assembly. It would be useful to be able to control the dispensing of milk to prevent initial splattering as well as splattering at the end of a dispense cycle. Splattering at the end of a dispense cycle may also be due to the relatively aggressive dispensing of liquid as the chamber defined by the assembly clears of the generally continuous mass or flow of milk foam at the end of a dispensing cycle.

Additionally, molding a continuous structure of a material with different dimensions and cross sectional areas can result in sinks, irregularities, and surface indentation as a result of different cooling rates within the mass of material. It would be preferable to find a way to resolve this problem so that the insert used within the assembly will provide a generally predictable and consistent dimensional tolerance, generally independent of any surface irregularities.

BRIEF DESCRIPTION OF THE DRAWINGS

FIG. 2 is an exploded perspective view of the assembly as shown in FIG. 1 illustrating the relationships between the dual component, gasketing associated between the component and the whipping chamber, the output nozzle having a generally hollow tubular construction, and an insert having an elongated configuration for cooperatively being engaged within the hollow volume defined by the nozzle, with the component delivering milk and air or optionally milk, air, and steam in a controlled manner to mix the ingredients and deliver the ingredients to the whipping chamber under pressure, delivering the ingredients through the whipping chamber to passages and paths defined between internal surfaces of the whipping chamber and the nozzle and external surfaces of the insert, and dispensing a controlled milk foam from an exit port of the nozzle;

DETAILED DESCRIPTION

Figure 1:
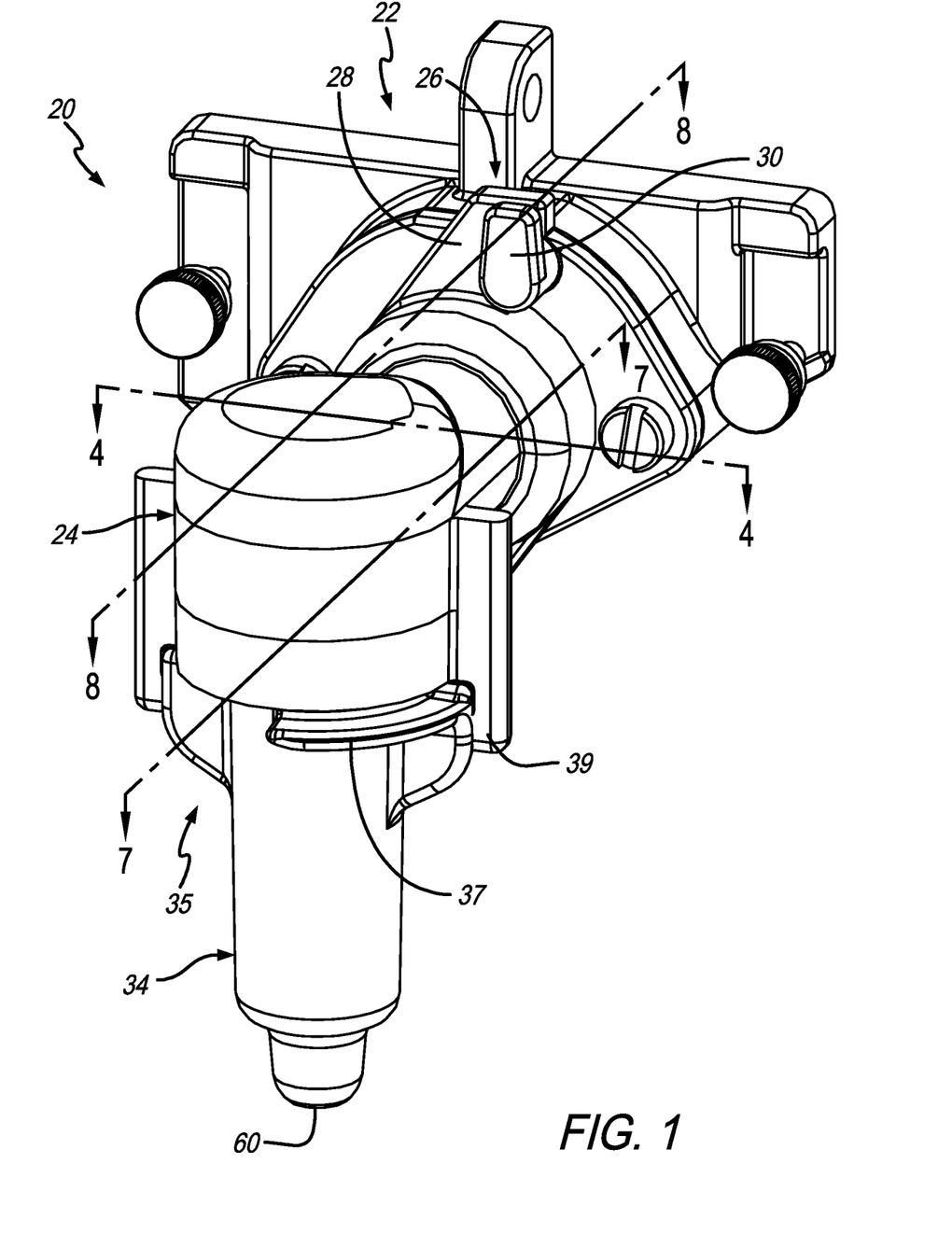
FIG. 1 shows an enlarged perspective view of a milk dispensing assembly including a multiple ingredient component, a whipping chamber, and an output nozzle, the component being removably attached to a larger apparatus for controllably delivering milk, air and, selectively, steam to the assembly with the whipping chamber being removably attachable to the component, and the output nozzle being removably attachable to the whipping chamber.

With reference to FIG. 1, a milk foam producing assembly 20 is disclosed. As previously referenced herein U.S. Pat. No. 9,386,878 is incorporated herein by reference with regard to the teachings relating to the general combination of milk, air or milk, air and steam to produce a milk foam product. The control, dispensing, and details associated with the delivery of these ingredients and mixing of the ingredients through a positively pressurized shearing process is disclosed in the identified patent. The milk foam producing assembly 20 is not limited to use with the device and/or system in the identified patent and may be used with other devices for delivering ingredients to the milk foam dispensing assembly 20. While milk is referred to herein, other ingredients that can be used to make consumable foam for use in food preparation could be used. The use of this apparatus, system, and method is not limited to use with milk even though milk is referred to by way of illustration and not limitation. While adjustments might be needed to achieve desired results ingredients other than milk could be used to create a foamed food substance. This system could also be used for creating a foamed product using other ingredients, not limited to food ingredients, having a generally uniform bubble size.

The present disclosure as shown in FIGS. 1-11 discloses and teaches an apparatus, assembly, and method which can be used to enhance the quality, homogeneity, repeatability and other characteristics of milk foam product dispensed from the assembly. In addition, the components of the assembly can be disassembled without tools and deposited in a cleaning and/or sanitation system for cleaning. The assembly can be reassembled without the use of tools once it is cleaned. The assembly is designed within the National Sanitation Foundation (NSF) standards for such food contact structures.

With regard to FIG. 1, a milk foam assembly 20 is illustrated. The milk foam assembly includes a multiple ingredient component or base 22 that can be attached to an ingredient dispensing apparatus as described below. The ingredient dispensing apparatus includes, by way of illustration and not limitation: milk and air; or milk, air, and steam. These ingredients are mixed to produce cool, ambient, heated, or other controlled temperature milk foam. The base 22, attached to the apparatus, is used as a mounting platform and connector to attach additional components of the assembly 20 and provide an interface with the sources of milk, air, steam, and/or other ingredients provided at and from the ingredient dispensing apparatus.

A whipping chamber 24 is attached through a twist lock assembly 26 with an arm component 28 of the twist lock assembly 26 carried on the whipping chamber 24 and a retaining lug 30 on the base 22. The arm 28 and lug 30 attach the whipping chamber without the use of tools to the base 22 and also permits tool-less disassembly of these components. A similar twist lock assembly 35 is used to attach the nozzle 34 to the whipping chamber 24 without the use of tools. The outlet nozzle 34 has a pair of flanges 37 that are releasably attachable to a corresponding pair of grip projections 39 extending from the whipping chamber 24. As will be described in greater detail, the whipping chamber 24 communicates with one or both of the dispensing ports 110, 112 (see FIG. 7-8) of the base 22, it is possible to have one or two ports as needed by the beverage recipe, and the nozzle 34 communicates with the whipping chamber 24, these assembled components provide a path within interior spaces defined by the chamber 24 and nozzle structures 34 through which ingredients are combined, managed, and dispensed.

Figure 2:
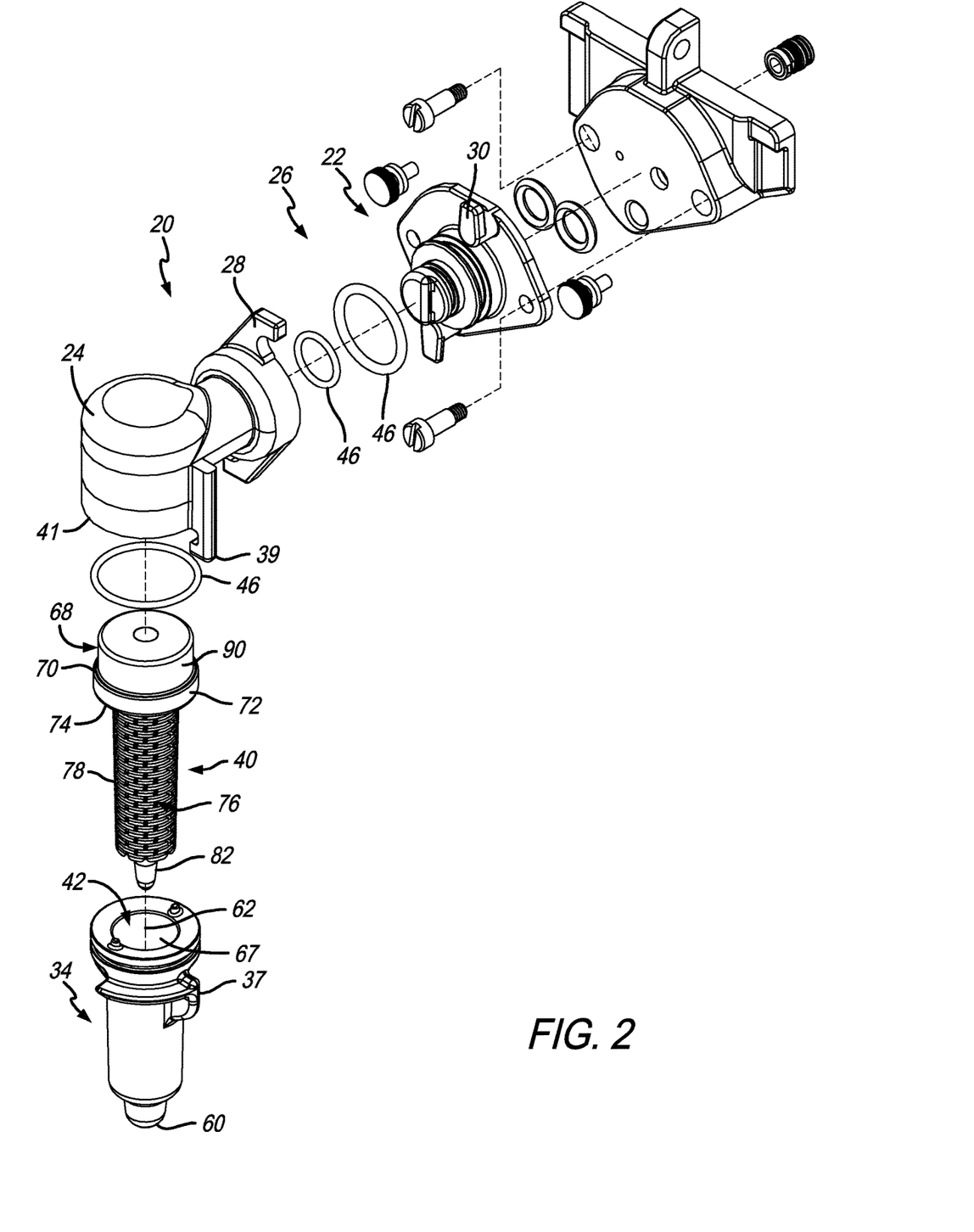
Figure 3:
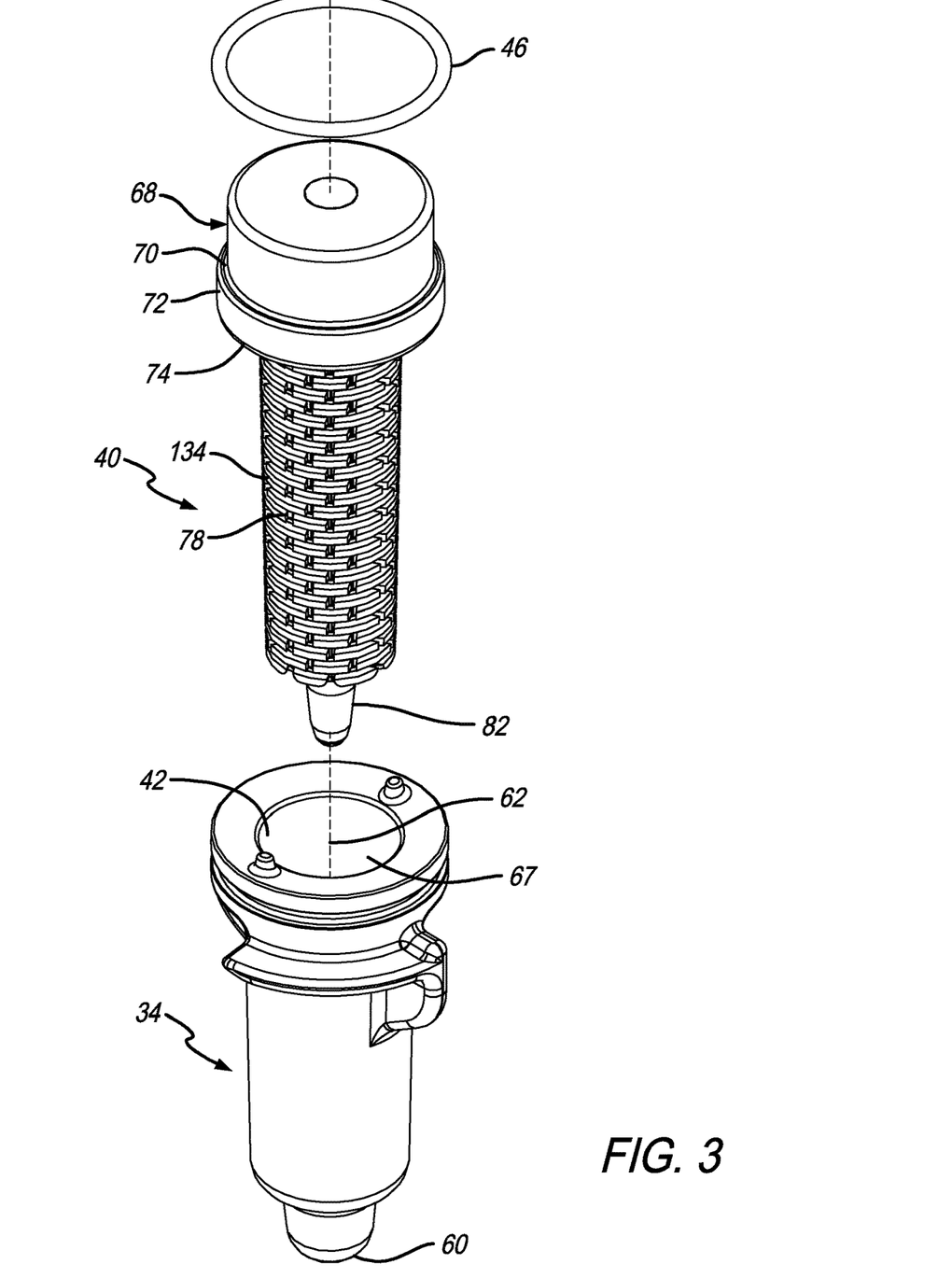
FIG. 3 is an enlarged perspective view of the insert and the corresponding tubular nozzle aligned along a common axis.

FIG. 2 shows an exploded perspective view of the assembly 20. The exploded perspective view shows an example of the base component 22 with the whipping chamber 24 and the nozzle 34. Also shown in the exploded view is an insert 40 with an upper portion 68 that is positioned for engagement in a cavity 41, generally, of the whipping chamber 24 and an elongated lower portion 76 in a corresponding elongated cavity 42 of the nozzle 34. Gaskets 46 are positioned between various components, as will be illustrated in cross sectional views herein, to provide generally liquid tight sealing between various components to prevent leakage during the generally positively pressurized dispensing process. A common central axis 62 defines the alignment of the insert 40 for positioning within the hollow passage 42 of the nozzle body 34.

The present ingredient dispensing apparatus on which the assembly 20 is attached includes positive pressurizing apparatus operating in a method/process in which milk and air are positively dispensed through the corresponding passages 110, 112 to the cavity 41 of the whipping chamber 24. The steam, if it is used, such as in heated milk foam, is also positively pressurized resulting in all the ingredients being positively pressurized and delivered through the system. This is different from other prior art systems which might use vacuums. The vacuum systems are generally less consistent and less predictable compared to the positively pressurized system. The positive pressure of the present system can be useful in the controlled production of high quality, consistent, repeatable milk foam products to be dispensed from an exit port 60 of the nozzle.

Figure 4:
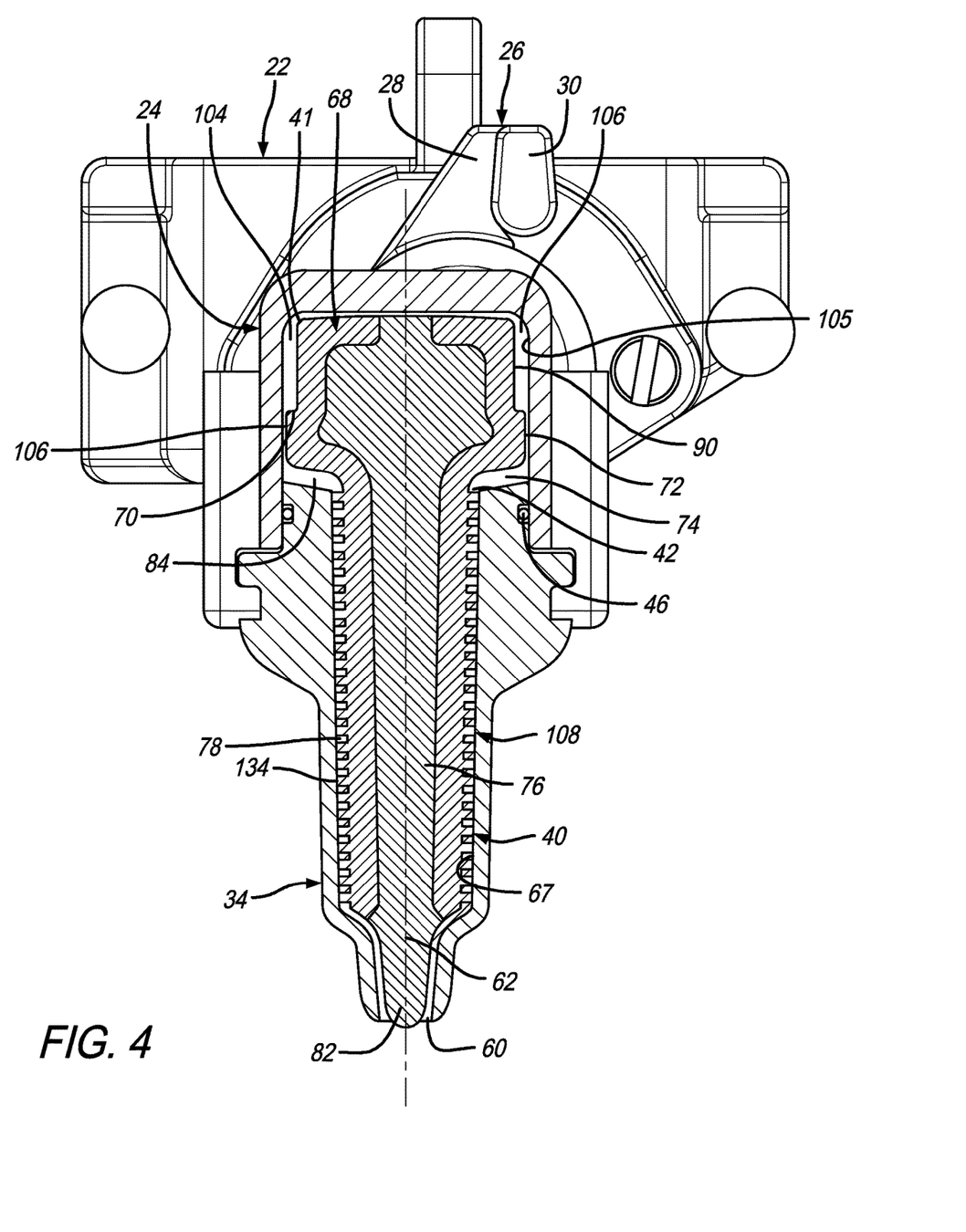
FIG. 4 is an enlarged cross-sectional view taken along line 4-4 in FIG. 1 showing the assembled relationship of the insert within the cavities defined within the whipping chamber and nozzle assembled to the whipping chamber for controllably managing ingredients in the creation of generally homogenous, high quality, consistent milk foam.

Turning to FIG. 4, a cross sectional view is disclosed taken along line 4-4 in FIG. 1. The cross sectional view shows the generally conforming fit of the insert 40 against an internal surface 67 within an interior cavity 42 of the nozzle 34. The insert 40 includes the upper portion in the form of a generally cylindrical head 68, a shoulder 70, a rim 72, a necked portion 74, and the elongated lower portion in the form of the elongated columnar body 76 having numerous channels 78 formed on the exterior surface thereof. A lower end of the insert 40 terminates in a laminating tip 82. Flow from the component 22 flows through a cavity 84 generally defined between an inside surface 86 of the whipping chamber 24 and exterior surfaces (68, 70, 72, 74) of the insert 40 ingredients continue to flow past this cavity 84 to a series of channels 78 defined between recessed surfaces or slots formed by structures on the exterior surface or in the exterior surface of the elongated portion 76. The milk foam continues to flow through these channels 78 until it reaches the exit 60 of the nozzle 34.

Figure 5:
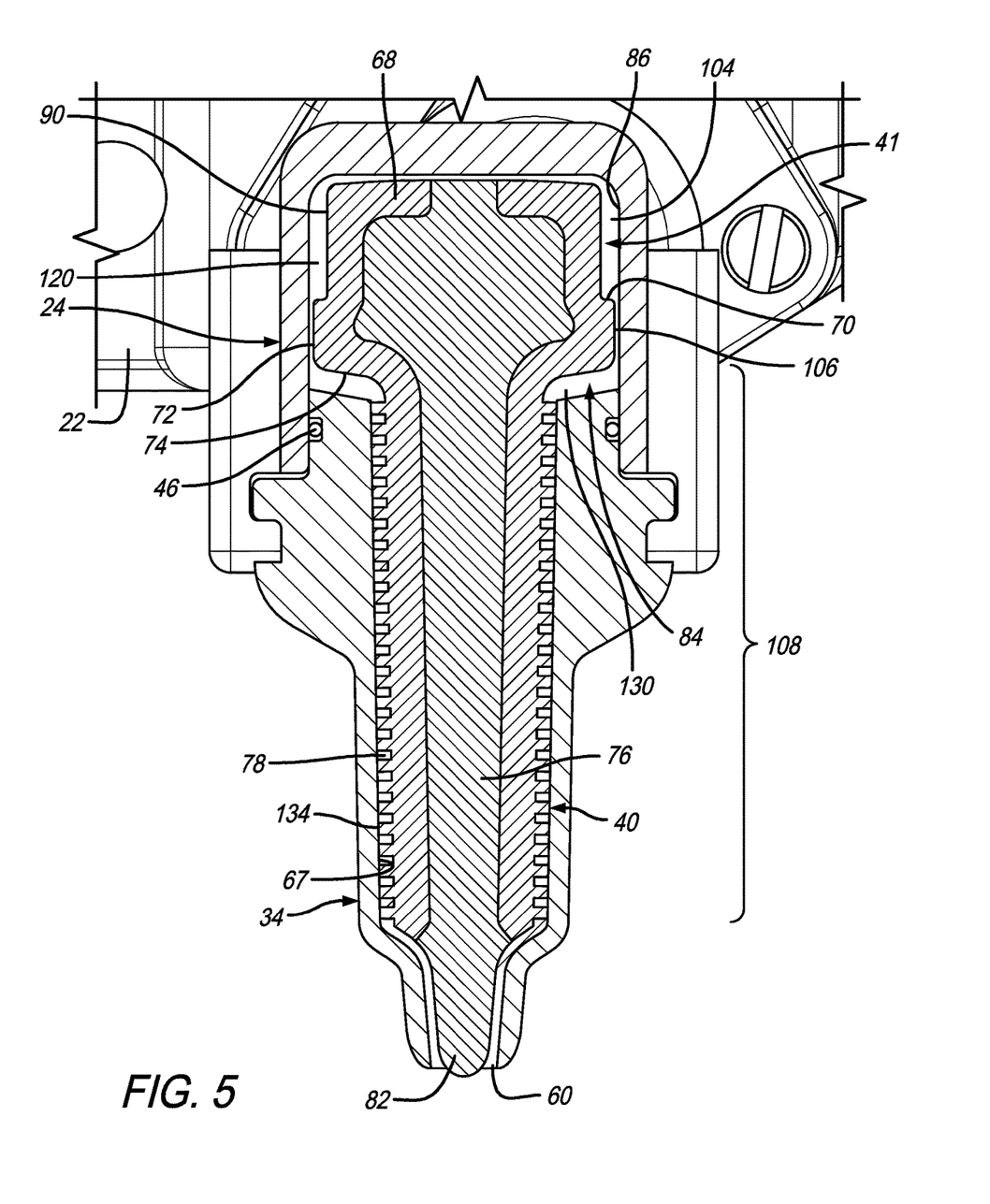
FIG. 5 is a further enlarged cross sectional view similar to that as shown in FIG. 4 illustrating at least three zones including: 1) a mixing zone communicating with the exits of the ingredients; 2) a shredding zone for controlling foam bubbles outside of a predetermined range of bubble sizes; and 3) a deceleration zone communicating with the shredding zone for decelerating the mass of generally fluid ingredients flowing through the system, maintaining the ingredients in a generally integrated state, and helping facilitate a laminar flow for producing and dispensing milk foam from the exit port.
Figure 6:
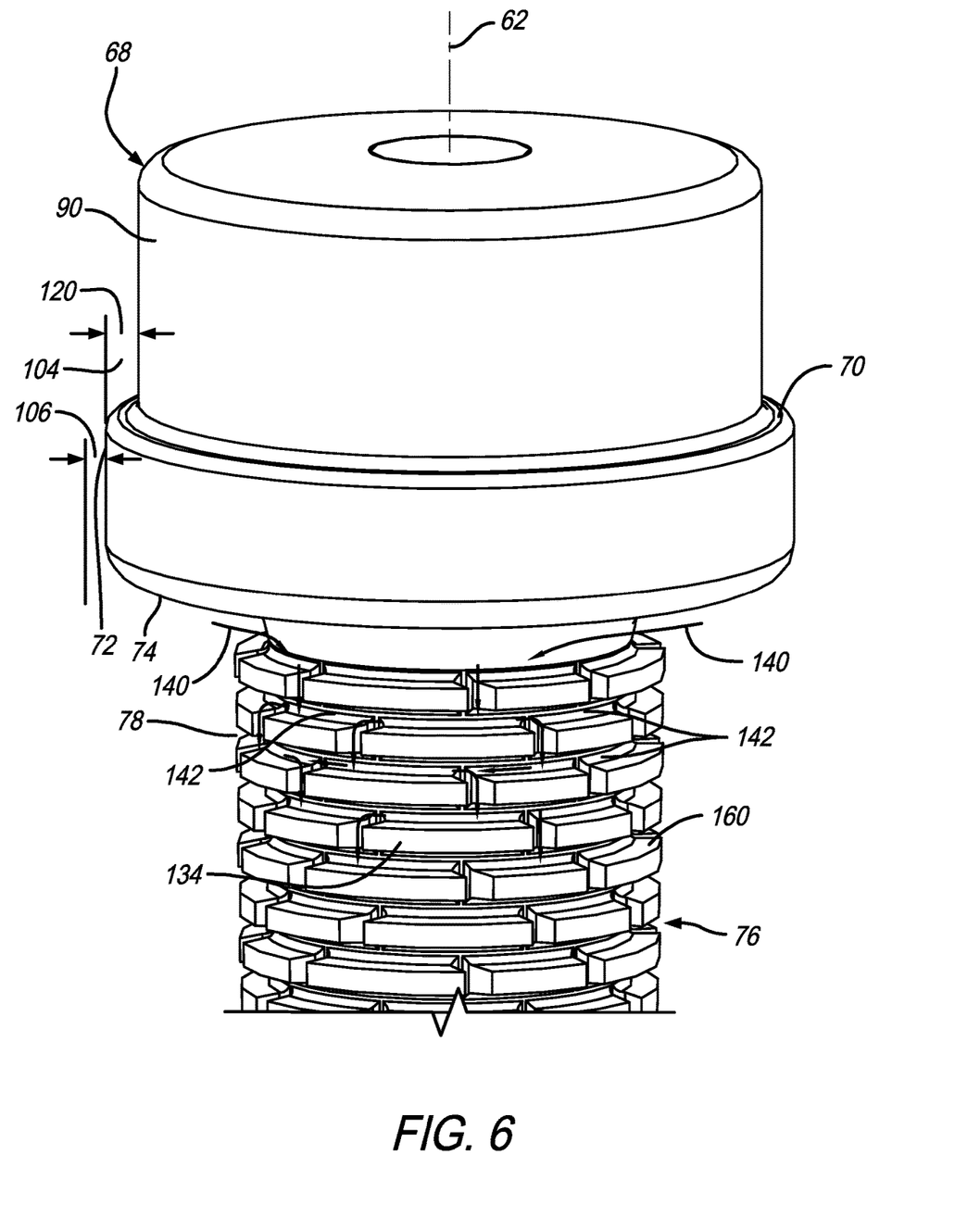
FIG. 6 is an enlarged perspective view of the insert showing additional details relating to the upper portion or head relative to a shoulder defining, at least in part, a mixing or intermediate space, the relationship of the shoulder to an annular rim which is used in defining the shredding zone between a rim and the internal surface of the cavity defined by the whipping chamber and/or nozzle and transitioning to the deceleration zone where milk foam is directed through channels to provide impact and homogenization which also reduces kinetic energy during the process.
Figure 7:
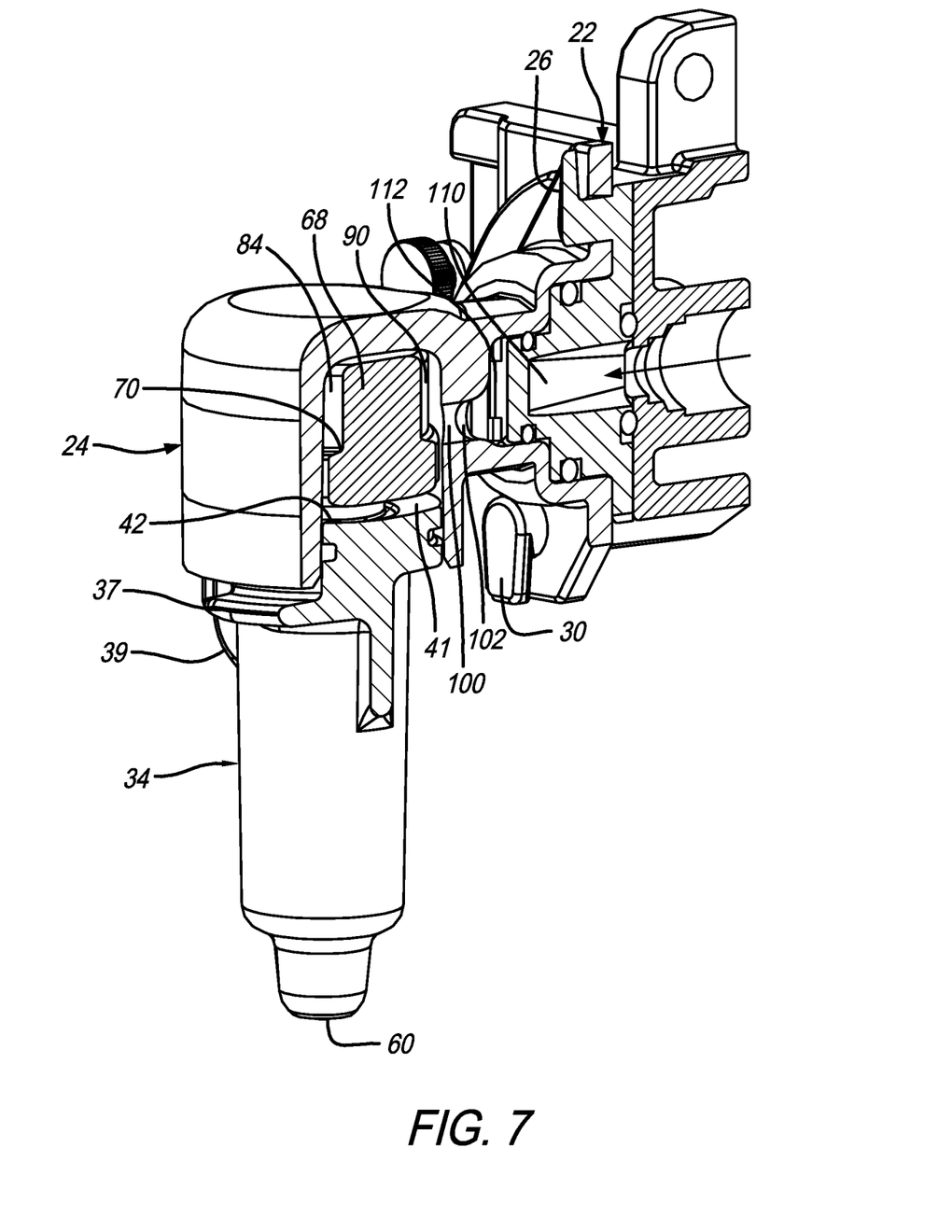
FIG. 7 is a cross sectional perspective view taken along line 7-7 in FIG. 1 showing the ingredient dispensing area of the component which communicates with a mixing passage of the whipping chamber, with the mixing passage communicating with the intermediate space proximate to the head of the insert.
Figure 8:
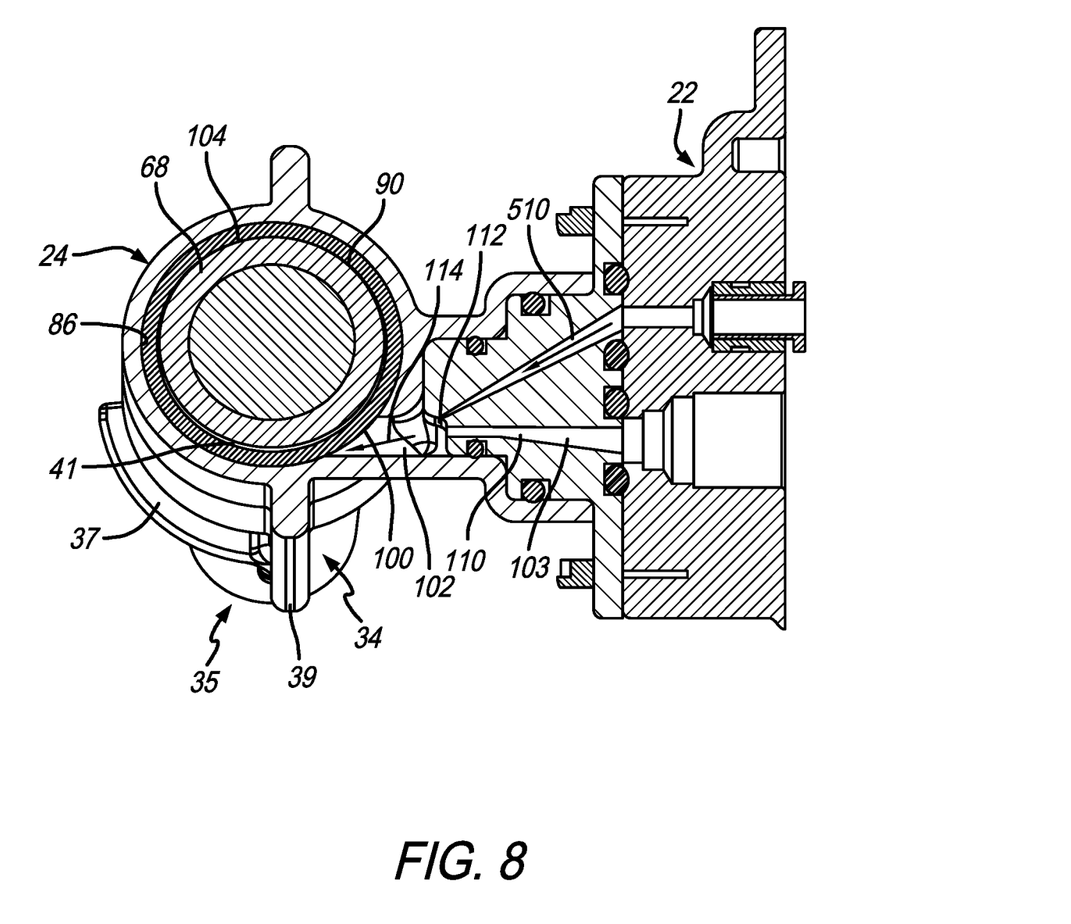
FIG. 8 is a cross sectional view taken along line 8-8 in FIG. 1 generally perpendicular to the view as shown in FIG. 7 to illustrate the relationship of the ingredient dispensing ports, mixing passage and intermediate zone relative to the head within the whipping chamber.

The structures described with regard to FIG. 4 are shown in greater detail in FIGS. 5 and 6. Descriptions of the operations of these structures and surfaces for use in producing milk foam products will also be described with reference to FIGS. 7 and 8. With reference to FIGS. 5 and 6, the relationship of an interior surface 105 of the cavity 41 of the whipping chamber 24 and exterior surfaces and features of the insert 40 are described. As shown in FIGS. 5 and 6 the head 68 is defined by an upper portion of the insert having a generally annular exterior wall 90 that is generally parallel to the central axis 62 of the insert 40. With reference to FIGS. 7 and 8, the head wall 90 is positioned generally in opposition to and cooperatively near an exit opening 100 of a mixing passage 102. The mixing passage 102 communicates through the port to a mixing zone 104 defined in the cavity 41 as a passage between an interior surface 105 of the whipping chamber 24 and the head wall 90 when the upper portion 68 is in the cavity 41. As will be discussed in greater detail hereinbelow, the present disclosure includes structures that generally define three zones including a 1) mixing zone 104, 2) shredding zone 106, and 3) deceleration zone 108. These three zones (104, 106, 108) are used to receive, manage, and dispense milk foam.

When milk and air or milk, air, and steam (or broadly other ingredients) which might be used in this process are brought together these ingredients are mixed through a shearing action at the corresponding optional outlets 110, 112. The ingredients pass from these one or multiple optional outlets 110, 112 to the mixing passage 102. The mixed ingredients 114 (see FIG. 8) flow through the mixing passage 102 at a relatively high velocity and swirl or rotate around the generally annular passage 104 defining the mixing zone (see FIG. 8). After this initial mixing in the mixing passage 102 and swirling through the mixing zone 104 the ingredients, now in the form of a combined milk foam, slightly or generally decelerate and flow through the shredding zone 106. The shredding zone 106 is defined in the cavity 41 between an exterior surface 74 below the shoulder 70 of the insert 40 and the annular rim 72 below the shoulder 70 when the upper portion 68 is in the cavity 41. The shredding zone 106 starts as a relatively narrower passage 120 compared to the mixing zone 104. The shredding zone 106 is sized and dimensioned to allow milk foam bubbles within a particular size range to flow there through. Bubbles which are defined by cell boundaries larger than the passage dimension 120 defining the shredding zone 106 tend to be collapsed or collapse into smaller bubbles under the pressure of the system thereby allowing milk foam having bubbles of a particular size range to pass through the shredding zone 106.

As previously noted, this system is positively pressurized by the ingredients being pumped, moved or otherwise passing through the passages defining the assembly. This positive pressurization helps continue to move the entire mass of combined ingredients through the process consistently and in a controlled or managed manner. The system regulates the amount of each ingredient contributed to the process. In this regard, the control of the milk and air, as well as steam if used, is regulated upstream of the assembly 20 to help control the flow of the combined ingredients. No additional air is introduced to this system at the dispensing assembly 20. While the gaskets 46 prevent leakage of ingredients, they also can be used to prevent the introduction of air. This allows the system to continuously and generally consistently move the combined ingredients through the system passages. The controls or regulations on the dispensing of the ingredients, controlled upstream of the assembly can be tuned to drive the mass of ingredients through the assembly without prematurely or unnecessarily collapsing bubble cell boundaries. The controlled pressure on this system as well as the dimensional characteristics of the passages help to promote a controllably consistent, generally homogenous milk foam.

As the generally consistent range of bubble sizes flows through the shredding zone 106 the milk foam passes through a preliminary passage 130 of the deceleration zone 108. Milk foam accumulating in this preliminary area 130 flows into numerous passages or channels 78 defined along the lower elongated portion 76 of the insert 40. The channels 78 are defined by geometric structures, shown herein as generally rectangular-type structures 134. A series of these geometric structures 134 spaced apart along the exterior surface of the elongated portion 76 define the channels 78 in the spaces between neighboring and/or opposing surfaces of the geometric structures 34.

Milk foam (shown diagrammatically by arrows 140) flows from the shredding zone 106 to the preliminary zone 130 defined as the volume proximate the necked area 74 of the insert 40. The milk foam 140 flows through channels 78 taking a path of least resistance at each intersection 142. At the start of a milk foam dispensing process or dispensing cycle these channels 78 may be relatively empty of milk foam but soon fill up with milk foam. As such, milk foam tends to cascade through this labyrinth under some degree of relatively consistent pressure.

One of the objectives of passing milk foam through this deceleration zone 108 is to decelerate the milk foam and reduce the energy in the milk foam. This tends to continue to homogenize the bubble size retaining bubbles of sufficient strength to persist through the channels and maintain a generally consistent blend of ingredients. In other words, the bubbles tend to not all dissociate or collapse which might otherwise result in large pockets of air. To the contrary, the deceleration zone 108 helps maintain a consistency of the combined ingredients for dispensing. The deceleration zone 108 also tends to allow the milk foam to become more laminar as it is generally evenly distributed around the exterior surfaces defined by the channels 78. This helps evenly distribute the milk foam around this elongated portion 76 and the corresponding channels 78 for generally consistent dispensing, ultimately through the exit port 60.

While milk foam exiting the port 60 is still pressurized to some degree it does not splatter or disassociate when it exits. This helps to also maintain the consistency of the milk foam. Splattering or disassociating of the milk results when there is too much energy in the milk foam at the dispensing point causing the boundaries to collapse and the bubbles to implode or explode. The deceleration zone 108 also helps to more evenly transition the milk foam from a higher pressurization state near the mixing passage 102 in the whipping chamber 24 all the way down to the exit port 60 of the nozzle 34. Dissociation is reduced by reducing the energy and pressure within the milk foam helping to maintain the coherency or consistency of the milk foam.

In use, the assembly 20 is attached to a dispensing apparatus of generally known construction for delivering ingredients to the assembly 20. The component or base 22 is attached to the apparatus so that milk and air or milk, air, and steam, or other ingredients for the recipe like syrups, can be mixed by dispensing the ingredients from the corresponding optional openings 110, 112 into a mixing passage 102. The mixing passage is provided on the whipping chamber 24 for communicating between the ingredient dispensing ports 110, 112 and an internal cavity 41 of the whipping chamber 24.

It should be noted that the whipping chamber 24 is removably attachable to the base 22 without the use of tools as a result of a quarter turn or pivot lock finger 28 and lug 30 tool-less mounting arrangement 26.

The output nozzle or nozzle 34 is similarly attached to the whipping chamber 24 by the use of a tool-less connection 35 having the projection 39 which grips a corresponding flange 37 when engaged and rotated. Ingredients delivered from the apparatus through the base 22 flow through various passages within the whipping chamber 24 and nozzle 34 for dispensing from an exit port 60 in a generally consistent manner.

The system is positively pressurized such that milk and air or milk, air and steam are combined under pressure and generally, continuously moved from the dispensing optional openings 110, 112 through the entire system to the exit port 60. During the initial phase of dispensing foam from the assembly 20 the downstream portion of the whipping chamber and nozzle may not contain much of the combined ingredients. However, as ingredients fill the passages a slight backpressure may develop to help produce consistency in the system.

As the combined ingredients are moving through the system the flow downstream from the mixing passage 102 flows into the mixing zone 104. After moving through the mixing zone 104 the ingredients are directed through the shredding zone 106. The transition from the mixing zone 104 to the shredding zone 106 provides a directional orientation of the bubbles in the foam. Initially as the milk foam exits the mixing passage 102 it swirls at least some distance around the generally annular passage defining the mixing zone 104. As the milk foam flow decelerates it flows, under pressure, through the generally vertically aligned shredding zone 106.

Next the milk foam flows, under pressure, through a preliminary area 130 of the deceleration zone 108. As the milk foam flows into the deceleration zone 108 the milk foam is flowed under some degree of pressure through various channels 78 and is moved against various impact surfaces 160 defined by the structures 134 as it flows from a first channel 78 oriented in a generally vertical direction to a second generally horizontal branching channel communicating with the first channel but generally perpendicular thereto. The channels spread out the pressure and material in the milk foam distributing it generally equally circumferentially around the elongated portion 76 of the insert 40.

The deceleration zone 108 helps reduce the kinetic energy and evenly distribute the pressure on the milk foam over a dimensional length of the insert 40. The shredding zone 106 and deceleration zone 108 tend to provide a gating feature which prevents bubbles outside of a predetermined range of bubble sizes from passing through the passages defining these zones 106, 108. It is believed that the zones 106, 108 and the corresponding surfaces and structures do not actually create the foam but they help to groom and maintain the foam in a consistent, controllable, and repeatable manner and structure. Bubbles that are too large to pass through the zones are collapsed into smaller bubbles under the generally consistent positive pressure. While positive pressure has been discussed, the pressure need not be highly elevated to provide the necessary function of promoting dispensing of milk foam. The pressure helps to provide a force to drive the milk foam product through the system and also helps to maintain air entrained in the milk foam in a generally consistent manner thereby preventing the collapse of many bubbles and the creation of or consolidation into large air filled passages.

When the milk foam completes its journey through all the numerous channels 78 distributed around the circumferential area of the elongated insert 40 the milk foam is dispensed through an exit port 60 at the tip of the nozzle. The milk foam exiting the tip tends to flow out in a generally consistent manner without splattering. The absence of splattering tends to indicate that the milk foam and air mixture is highly integrated and positively yet appropriately pressurized. The density of generally consistent sized bubbles tens to help provide a tension in the flow that, along with some degree of pressurization tends to help prevent unintended or uncontrolled evolution of air from the milk foam.

The generally cylindrical head has a wall 90 surface oriented with the annual surface generally parallel to the elongated axis 62 of the insert 40. The shoulder 70 is provided between the generally cylindrical portion of the head 68 and transition zone at the shoulder 70.

While various orientations and structures are shown in the attached drawings and this description other variations may be developed. As an example, the channels 78 on the elongated portion of the insert 76 could be angled relative to the central axis 62 to provide a more spiral flow pattern. This would still promote the transition through generally vertically oriented channels to generally horizontally oriented channels and provide the impact effect created by these flow patterns. Additionally, splines or additional channels could be added to the generally cylindrical outside surface 90 of the head 68. These splines could be vertically oriented or spirally oriented to help promote a portion of the combined ingredients downwardly towards the shoulder 70 while a remainder of the portion circulates around the circumference of the outside surface 90. While these alternate embodiments could be included in the present disclosure the most basic or essential forms are initially shown and described with the understanding that additional structures and features may be added to this initial embodiment.

The assembly 20 helps promote the combination, management, and dispensing of high quality, consistent milk foam from the assembly 20. The milk foam may either be in a cool, ambient or heated form. In the cooled form steam might not be used. Similarly, in the ambient condition steam might be used although it might be balanced with a temperature associated with the milk and air combination.

Figure 9:
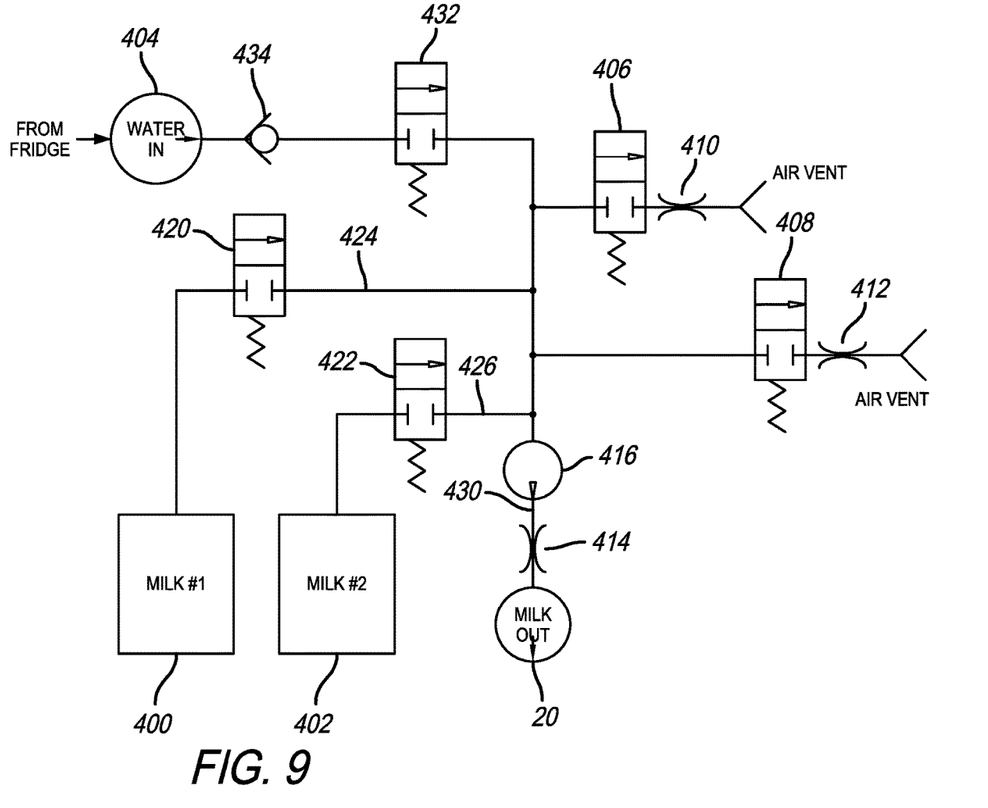
FIGS. 9 and 9a is a diagrammatic illustration of an espresso milk dispensing system incorporating adjustable orifices and controllable dispensing of milk foam which can be used with the milk dispensing assembly of the present disclosure, illustrating the use of multiple sources of milk or other ingredients, the controlled use of air and/or steam, as well as a rinse feature.
Figure 9A:
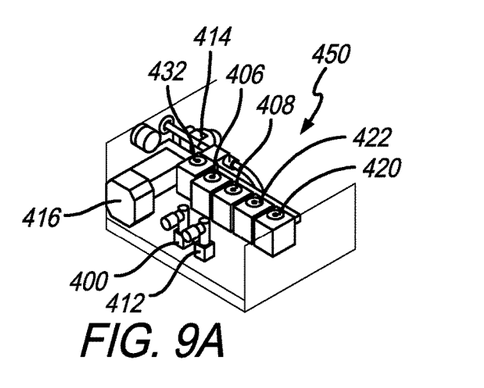
Figure 10:
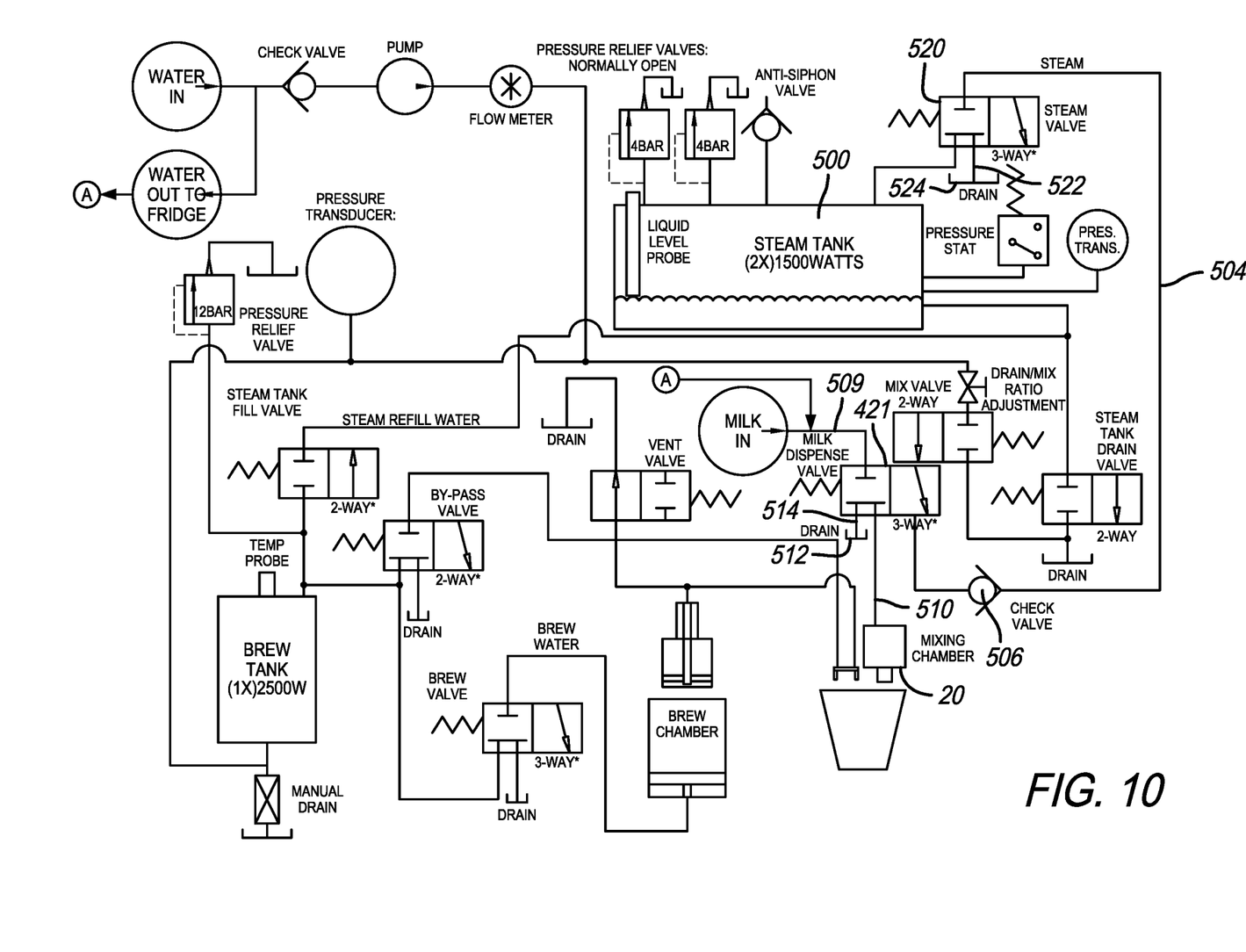
FIG. 10 provides a more detailed diagrammatic illustration of the system illustrating the overall flow of the various ingredients through the system for controlled dispensing to a mixing chamber as described with regard to the milk dispensing assembly.

With reference to FIGS. 9, 9a, and 10, an embodiment of the ingredient dispensing apparatus is illustrated. All of the components described in the following are connected as shown over lines or passages as indicated to facilitate controlled dispensing of ingredients to the assembly 20. As shown, the system of FIG. 9 includes a first milk source 400, a second milk source 402, and a water source 404. Controllable air inlets 406, 408 are provided. Adjustable orifices 410, 412 are coupled to and communicate with the corresponding valves 406, 408, respectfully. The adjustable orifice 410 provides a maximum 0.010 opening whereas the adjustable orifice 412 provides a maximum 0.025 opening. Additionally, an orifice 414 positioned between a pump 416 and the foam output portion 20 is sized and dimensioned with a 0.028 orifice. Milk sources 400, 402 include corresponding controllable milk valves 420, 422, respectively. The milk sources are coupled via lines 424, 426, respectively to the dispensing line 430.

The adjustable orifices 410, 412 provide controlled introduction of air over a range of settings. A controllable rinse valve 432 is provided on the water inlet line downstream from a check valve 434 to controllably dispense water, on demand, through the dispensing line 430. The insert diagram FIG. 9a includes representation of these components on a control assembly 450.

With reference to FIG. 10, some of the same structures will be referenced with additional detail to the overall operation in use to produce milk foam. One of the problems that arises with the dispensing of milk foam is that the relatively high energy active steam produced at the steam tank 500 tends to produce splattering as it flows through an otherwise, generally, empty dispensing assembly 20 when initially dispensing foam at the beginning of a dispensing cycle. The present disclosure reduces or eliminates such splattering at the start of the dispensing cycle and also reduces splattering or eliminates splattering at the end of the dispensing cycle. Generally, there is less of a chance of this splattering effect occurring when cool or cold milk foam is produced. This is because cool or chilled milk foam is primarily a combination of milk and air mixed under pressure to create agitation and bubble or foam cells within the combined ingredients. In this unheated milk foam there is lower energy, compared to the steam used in the heated milk foam and as such less splattering.

As shown in FIG. 10, milk can be controllably dispensed through the milk valve 421. The milk valve 421 is a three way valve which is controllable to permit the introduction of steam through line 504 from the steam tank 500. The steam line 504 communicates with the valve 421 includes a check valve 506 to prevent backflow of steam. Once the steam is controllably introduced into the milk line 509 the combined milk and steam can be dispensed through line 510 to the mixing chamber 20. The valve includes the option to shunt milk to a drain 512 through drain line 514.

A solution to the problem of energetic steam causing a splattering effect is the use a controllable three way steam valve 520. The steam valve includes a line 522 that can controllably shunt steam to a steam drain 524. This allows for the controllable introduction of steam to the milk dispensing process. In other words, milk and air can start to be dispensed momentarily before steam is introduced thereby allowing some foamed milk to be introduced into the dispensing assembly 20 before introducing steam, momentarily after the milk is introduced to the chamber 20. Introducing steam in this process enhances the foam production and reduces the spatter effect of steam flowing through an empty dispensing assembly.

With regard to FIG. 10, steam introduced through line 504 is delivered to the valve 421 and can be directed to the drain 512 momentarily before being combined with milk to allow milk to initiate dispensing through line 510 to the mixing chamber 20. This gives the system more control over the steam being dispensed to the drain 512 or the mixing chamber/dispensing head 20. In this alternative configuration, we refer to FIG. 8 to identify the line 510 which is shown in FIG. 8, in the alternative description, as a combined steam and milk line eliminating the need, in this alternative configuration, for the prior steam line 103. As such, the steam line 103 can be eliminated or plugged in the alternative embodiment as shown in FIG. 10. The steam valve can be in the form of a PWM (pulse width modulated) valve or a constant solenoid valve 520 (as shown) which is controllably constant open or constant closed with closed being the default mode. In the constant on off solenoid version the milk pump speed can be manipulated to obtain the desired temperature and flow of the resultant milk foam dispensed at the head 20.

Similarly, at the end of a dispensing cycle the steam can be controllably stopped or decreased at the valve 520 momentarily before ceasing dispensing of milk thereby allowing the energetic steam to exit with a continuous flow of milk foam followed by a continuous pressurized dispensing of milk, or milk with reduced steam content, for a brief period of time after cessation or controlled reduction of steam. The controlled momentary delay at the beginning of the cycle and the controlled momentary advance stopping or reducing of steam at the end of the cycle helps to reduce or eliminate splattering of milk at the dispensing end of the dispensing assembly 20.

Additionally, at the end of the cycle momentary dispensing of a small portion of unheated water, not including steam can be dispensed through the rinse valve 432 and shunted at the milk dispensing valve 421 to the drain 512 through the drain line 514.

Figure 11:
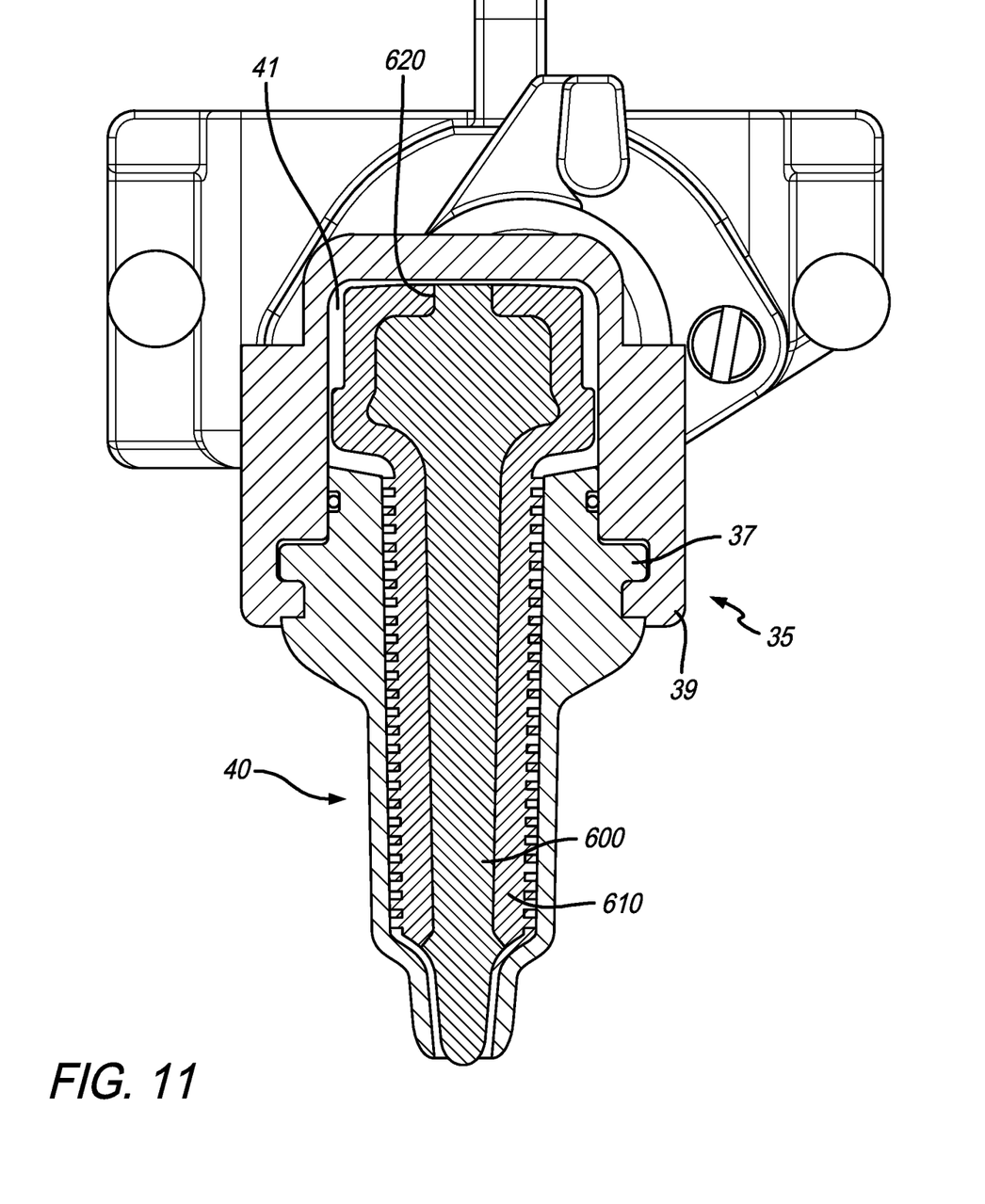
FIG. 11 is a cross sectional view of a multicomponent insert used in a milk dispensing assembly as described herein in which a core is formed including retaining portions at axially spaced apart ends of the core and a detailed feature is over the core to provide generally consistent and dimensionally accurate features on the external surface of the insert.

With regard to FIG. 11, the insert 40 is shown as being formed with two different layers or portions of material. In particular, an inner core 600 can be formed to provide a base or foundation for over molding the specific surface features, represented generally by molded portion 610. As the details of the features have been described hereinabove they will not be described again in detail. However, the process for achieving the desired results of the overall structure will be described.

One of the problems with molding a plastic structure for the core 600 is the various surface features have very specific dimensions, shapes, and relatively precise tolerances. A continuous molding process used to achieve such a structure could result in surface deformation, sinking, and other irregularities. This would be undesirable since it is preferred to provide a relatively precise tolerance for the surface features so that the surface features appropriately engage with the internal surface 67 of the nozzle 34 body. The relatively precise fit of the insert 40 against the inside surface 67 in combination with the channels or passages 78 defined by the structures 134 on the outside surface of the insert 40 provides the structure that help the deceleration zone 108 function. As shown, the nozzle body 34 has a generally hollow interior structure or cavity 42 providing an interior surface for engaging the exterior structures of the insert 40. Because one of the objectives of forming the insert inside the nozzle body 34 is to maintain a series of channels and/or passages 78 the tolerance between exterior surface of the insert 40 and the interior surface 67 of the nozzle 34 is required to achieve this result. As can be appreciated based on the present disclosure failure to maintain tolerances could result in portions of the liquids flowing through the channels 78 bypassing the desired path and possibly resulting in milk foam which does not meet the required characteristics.

With the foregoing in mind, the interior core 600 is formed. While there are variations in the dimensions of the core, the overall structure of the core can generally be formed with relatively few irregularities. When the exterior portion is over molded on the core the generally more consistent cross sectional dimension of the over molded portion 610 will help to maintain the exterior tolerances of the insert. Any minor irregularities caused during the forming of the core will be filled in by the over molded portion 610 helping to produce a generally more consistent resulting exterior dimension and group of structures. The two portions can also be molded of different but compatible materials. For example the core 600 could be formed of a generally rigid material to provide consistent structural form, durability, and support for the insert 40. The over molded portion 610 may be formed of a more resilient material to provide somewhat more flexibility and give when inserted against the inside surface 67 of the nozzle 34. In this manner, the combination of materials can provide benefits in addition to maintaining the dimensional tolerances of the insert 40.

To achieve the molding process, the core includes a first protrusion 620 and a second protrusion 622 positioned at axially opposed ends of the core. The first protrusion 650 will be referred to as the top protrusion 620 and the second protrusion will be referred to as the bottom protrusion 622 for convenient use in the disclosure relative to the normal orientation of the assembly 20. The protrusions 620, 622 are provided during the initial molding process of the core 600 to provide fixturing points for the over molding of the exterior portion 610. The fixturing protrusions 620, 622 help provide a more precise fixturing of the core in the over molding tool to provide consistency in the over molding process and to provide precise seamless molding of the over molded portion 610. This allows for a generally continuous over molding especially in the central portion of the insert body where the most precise tolerances must be maintained to achieve the structures used to define the channels on the exterior surface of the insert. The central elongated body portion of the insert is formed with a roughly one half degree-one degree draft to help facilitate removal of the molded component from the tool.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. An ingredient dispensing assembly for use on ingredient dispensing apparatus to dispense and combine ingredients to produce ingredient foam, the ingredient dispensing assembly comprising:
   - a base component for attachment to the ingredient dispensing apparatus, with ingredient ports communicating with the apparatus for delivering ingredients to the assembly;
   - a whipping chamber defining a cavity therein being removably attachable to the base component;
   - an output nozzle removably attachable to the whipping chamber;
   - the output nozzle defining an elongated cavity therein communicating with the cavity in the whipping chamber and being removably attachable to the whipping chamber;
   - an insert removably positionable in the whipping chamber cavity and extending into the elongated output nozzle cavity;
   - the insert defining passages between external surfaces of the insert and internal surfaces of the whipping chamber cavity and the elongated output nozzle cavity;
   - the insert passages defining a mixing zone communicating with ingredient ports of the base component, a shredding zone communicating with the mixing zone, and a deceleration zone communicating with the shredding zone and extending to an exit port of the output nozzle.

2. The ingredient dispensing assembly of claim 1, further comprising the mixing zone primarily being located in the whipping chamber cavity, the shredding zone being at least partially positioned in the whipping chamber cavity, and the deceleration zone primarily being located in the cavity of the output nozzle.

* * * * *